Jan. 21, 1969 A. HERLET 3,423,649

PN-JUNCTION RECTIFIER WITH NON-FLASHOVER HEAT CONDUCTIVE OHMIC CONNECTORS

Filed June 27, 1966

United States Patent Office 3,423,649

Patented Jan. 21, 1969

3,423,649

PN-JUNCTION RECTIFIER WITH NON-FLASHOVER HEAT CONDUCTIVE OHMIC CONNECTORS

Adolf Herlet, Pretzfeld, Offenbach, Germany, assignor to Siemens Aktiengesellschaft, a corporation of Germany Filed June 27, 1966, Ser. No. 560,408
Claims priority, application Germany, June 25, 1965, S 97,821
U.S. Cl. 317—234 5 Claims
Int. Cl. H01l 5/02

ABSTRACT OF THE DISCLOSURE

A pn-junction rectifier is disposed between heat conductive contacts. One contact covers a whole side of the wafer and the other, covering a portion only of the opposite side, is spaced from the exposed edge of the pn-junction. A heat conductive plate engages this other electrode, over extending its edge while maintaining a non-flashover distance from the edge of the pn-junction.

Figure 1:
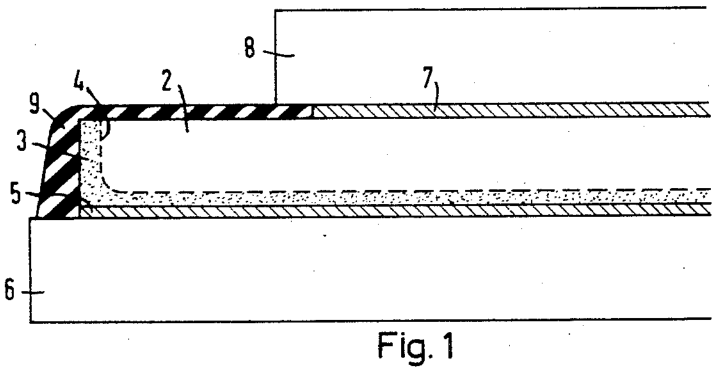

My invention relates to rectifier devices and more particularly to semiconductor rectifiers.

Rectifiers for power current are known which consist of a silicon disc having a pn, pin, or psn structure, and being contacted on both of its flat sides by metal electrodes, one of which consists, for instance, of aluminum, and the other of gold with an antimony content of about 1 percent. The first of these metal electrodes usually covers one flat side of the silicon disc completely, and in many cases is alloyed to a contact plate consisting, for instance, of molybdenum. The second electrode, as a rule, has a smaller area than the silicon disc. It covers only part of the other flat side, usually its central part, so that the outer rim of the silicon disc, which is 1 to 2 mm. wide, is not covered by the electrode. This rectifier tablet is built into its mounting in such a way that the completely contacted flat side thereof lies at the bottom of the mounting, and serves for dissipating the heat. The second metal electrode, having a smaller area, is, in general, not used for removal of heat, but is contacted only for the purpose of providing current input. Often, a second contact plate of molybdenum or tungsten is applied by soldering, alloying, or pressure contact to serve as a contact body. This plate is usually smaller than the metal electrode contacted by it, especially because a smaller plate for the input of current is completely adequate, whereas it is more difficult to apply a contact plate larger than the metal electrode, especially by means of soldering or alloying, than to apply a smaller plate.

It is frequently desired to manufacture rectifiers having an opposite polarity, but otherwise having the same characteristics so that the assembling of complicated circuits is considerably simplified. The opposite polarity of a rectifier can be obtained by turning the rectifier tablet around in its mounting and fixing the smaller metal electrode to the bottom of the mounting. When this is done, however, the heat dissipation has to be removed now through the smaller metal electrode. This heat dissipation, which is produced primarily during the forward operating period of the rectifier, originates almost exclusively in that region of the silicon disc which is limited by the dimensions of the smaller metal electrode, as a lateral spreading of the forward current in the silicon disc practically does not occur. If the contact plate is smaller than the metal electrode, then only part of the region in which the heat dissipation originates is effectively cooled, whereas in the region where the metal electrode extends beyond the contact plate, undue temperature rises can occur.

It has therefore been suggested heretofore that both contact discs be made equally large so that the heat dissipation is removed symmetrically toward both sides. This solution, however, is disadvantageous in that the distance in air between the contact plates is only as great as the thickness of the silicon discs, and the contact plate which covers the smaller metal electrode extends beyond the region of the silicon where the blocking pn junction appears at the silicon surface. This is unavoidable especially if the blocking pn junction is produced by the alloying process of the smaller metal electrode. In this case, the blocking pn junction appears at the silicon surface immediately beside the edge of the smaller metal electrode. The disadvantage of the foregoing suggested construction consists in that high reverse voltages cause flashover between the pn junction and the contact plate above it, and between the upper and the lower contact plates, respectively. Since the narrow space therebetween cannot be readily filled with insulating lacquers without producing any flaws therein, this flashover cannot be completely eliminated by this known method, so that such a symmetrical construction is suitable only for rectifiers with a low reverse voltage but not for rectifiers with a high blocking capability.

It is accordingly an object of the present invention to provide a rectifier device of such construction and dimensions that even at high reverse voltages no possibility for flashover exists, and that substantially equal removal of heat is achieved from both sides of the rectifier tablet.

With the foregoing and other objects in view, in accordance with my invention. I provide a rectifier device wherein the molybdenum disc which covers the smaller metal electrode is larger than the latter, but does not protrude beyond the pn junction.

More specifically, the invention relates to a rectifier device for power current which comprises a monocrystalline, disc-shaped semiconducting body containing a pn junction, one flat side of this body being completely covered by a first electrode and a first contact plate on top of it, and a central region of the opposite flat side being covered by a second smaller electrode and a second contact plate. A characteristic of the invention is that the location at which the pn junction line meets the surface of the semiconductor disc is more than 1 mm. from the second electrode, and that the surface of the second contact plate facing the second electrode is larger than the second electrode, but protrudes beyond or overlaps the latter a distance less than 1 mm. The effect of this combination is on the one hand that the whole surface within which the heat dissipation originates is completely and evenly cooled even when the rectifier tablet is built into the mounting in inverted manner, and by the fact that the pn junction is accessible so as to be coated by a flawless lacquer covering and, because of the relatively large air space between the side portions of the two contact plates, no flashover of the voltage can occur.

Other features which are considered as characteristic for the invention are set forth in the appended claims.

Although the invention is illustrated and described herein as embodied in rectifier device, it is nevertheless not intended to be limited to the details shown, since various modifications and structural changes may be made therein without departing from the spirit of the invention and within the scope and range of equivalents of the claims.

Figure 2:
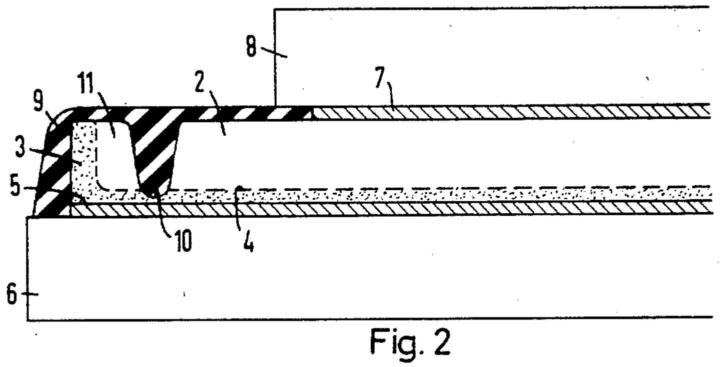
Figure 3:
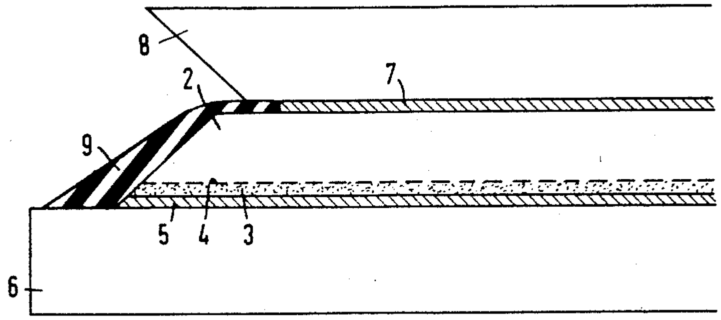

The construction and method of operation of the invention, however, together with additional objects and advantages thereof will be best understood from the following description of specific embodiments when read in connection with the accompanying drawings, in which:

FIGS. 1 to 3 are diagrammatic views partly in section of three different embodiments of a rectifier device constructed in accordance with the invention.

In FIG. 1, there is shown a flat circular disc of monocrystalline n-type silicon having an unchanged core portion 2. By indiffusion of acceptors the conduction type of an exterior layer 3 has been changed to p-type so that a pn junction 4 is formed. A foil containing acceptors, for instance aluminum foil, is alloyed as electrode 5 to the p-type flat side of the silicon disc, and is contacted by a contact plate 6 consisting, for instance, of molybdenum. A second circular electrode 7 which covers only a central region on the opposite flat side of the semiconductor disc is produced by the alloying of a metal containing donors, for instance a gold-antimony alloy. The distance of electrode 7 from the locality of the pn junction at the bottom silicon surface, as seen in FIG. 1, is at least 1 mm., and may be for instance 2 mm. A circular contact plate 8 of molybdenum or tungsten is fixed on top of electrode 7 and protrudes radially beyond it a distance less than 1 mm., preferably 0.2 to 0.5 mm., thus evenly cooling the whole effective area of the electrode 7. To avoid conducting bridges, and as a protective measure, the silicon disc is covered by a layer of varnish 9.

FIG. 2 shows a modification of the embodiment shown in FIG. 1, which, in order to avoid flashover, is provided with a groove 10 formed in the silicon disc, for instance by sandblasting or etching, and filled with varnish. The effective pn junction emerges at the surface of the semiconducting body only in the groove 10, and is protected by a dead region 11 of silicon and by the varnish 9. In FIG. 3 the silicon disc is bevelled, for instance also by sandblasting and etching.

In all three embodiments, sufficient distance is provided between the contact plate and the pn junction, so that the pn junction is easily accessible for applying the varnish coating. Furthermore, the air spaces between the contact plates are kept so large that no voltage flashover can occur between them, a minimum distance of 1 mm. being suitable for this purpose.

Devices according to the invention can be further improved by giving the contact plate that covers the smaller metal electrode 7 an outwardly widening shape whose diameter increases with the distance from the metal electrode. The contact plate 8' in FIG. 3 is constructed in this manner. This further improves the removal of waste heat, as well as the stability with respect to flashover. If the largest diameter of the top plate 8' is made as large as that of the bottom contact plate 6, it becomes particularly easy to mount the rectifier device selectively in a normal or a polarity-reversed position within its housing or other holder means.

While the invention has been described with reference to rectifiers whose silicon core region has n-type conductance, it analogously applies also, as to all details described, to rectifiers with interchanged p-type and n-type regions.

I claim:

1. Rectifier device comprising a disc of monocrystalline semiconductor material having a pn junction dividing said disc into substantially two layers of different conductivity type and extending to a surface location of said disc, a first electrode located adjacent and completely covering one flat side of said semiconductor disc in engagement with one of said layers, a first contact plate located adjacent said first electrode on a side thereof opposite to said semiconductor disc, a second electrode smaller than said first electrode located adjacent and covering only a partial central region of the other flat side of said semiconductor disc in engagement with the other of said layers, said second electrode being located more than 1 mm. from the location at which the pn junction meets the surface of said disc, and a second contact plate larger than said second electrode and having a surface facing said second electrode on a side thereof opposite to said semiconductor disc, said surface of said second contact plate overlapping said second electrode a distance less than 1 mm.

2. Rectifier device according to claim 1 wherein the distance in air between said first and second contact plates is greater than 1 mm.

3. Rectifier device according to claim 1 wherein said second contact plate has a greater surface area on the side thereof located opposite to the side adjacent said second electrode.

4. Rectifier device according to claim 1 wherein said semiconductor disc is coated with varnish on the surfaces thereof other than the surfaces covered by said first and second electrodes.

5. Rectifier device according to claim 1 wherein a groove is formed in said semiconductor disc surrounding said second electrode, said groove being of such depth as to intersect the pn junction.

References Cited

UNITED STATES PATENTS

| | | | |
|---|---|---|---|
| 2,861,226 | 11/1958 | Lootens | 317—234 |
| 3,040,197 | 6/1962 | Gudmundsen | 317—235 |
| 3,293,508 | 12/1966 | Boyer | 317—234 |
| 3,310,866 | 3/1967 | Anderson | 317—234 |

JAMES D. KALLAM, *Primary Examiner.*

U.S. Cl. X.R.

317—235, 242